(12) United States Patent
Park et al.

(10) Patent No.: US 9,528,478 B2
(45) Date of Patent: Dec. 27, 2016

(54) FUEL FEEDING SYSTEM FOR VEHICLE

(71) Applicant: Hyundai Motor Company, Seoul (KR)

(72) Inventors: Seung Hwan Park, Goyang-Si (KR); Pil Seon Choi, Anyang-Si (KR); Bu Yeol Ryu, Hwaseong-Si (KR); Seung Yup Oh, Hwaseong-Si (KR); Sung Hwan Chi, Seongnam-Si (KR)

(73) Assignee: Hyundai Motor Company, Seoul (KR)

( * ) Notice: Subject to any disclaimer, the term of this patent is extended or adjusted under 35 U.S.C. 154(b) by 86 days.

(21) Appl. No.: 14/540,955

(22) Filed: Nov. 13, 2014

(65) Prior Publication Data

US 2015/0369259 A1 Dec. 24, 2015

(30) Foreign Application Priority Data

Jun. 20, 2014 (KR) ........................ 10-2014-0075976

(51) Int. Cl.
*F02M 37/02* (2006.01)
*F02M 37/18* (2006.01)
(Continued)

(52) U.S. Cl.
CPC ....... *F02M 37/025* (2013.01); *F02M 37/0094* (2013.01); *F02M 37/103* (2013.01); *F02M 37/106* (2013.01); *F02M 37/18* (2013.01); *F04F 5/24* (2013.01); *F04F 5/46* (2013.01); *F17C 13/002* (2013.01); *B60K 2015/0325* (2013.01); *B60K 2015/0344* (2013.01);
(Continued)

(58) Field of Classification Search
CPC F02M 37/025; F02M 37/103; F02M 37/0094; F02M 37/18; B60K 2015/03138; B60K 2015/03105; B60K 2015/03144; B60K 2015/03111; B60K 2015/0344; B60K 2015/0325; B60K 2015/0777; Y10T 137/86075; Y10T 137/86212; Y10T 137/86043
See application file for complete search history.

(56) References Cited

U.S. PATENT DOCUMENTS

2011/0250079 A1* 10/2011 Kim ..................... F02M 37/025
417/198
2013/0248027 A1* 9/2013 Gutscher .............. B60K 15/077
137/565.11

FOREIGN PATENT DOCUMENTS

JP 2005-69171 A 3/2005
JP 2008-175094 A 7/2008
(Continued)

*Primary Examiner* — Atif Chaudry
(74) *Attorney, Agent, or Firm* — Morgan, Lewis & Bockius LLP

(57) ABSTRACT

A fuel feeding system for a vehicle may include a fuel tank and a subsidiary jet pump. The fuel tank is divided into a first portion in which a reservoir is installed and a second portion in which the subsidiary jet pump is installed. The subsidiary jet pump pumps out fuel pressurized by a fuel pump and causes the fuel in the second portion of the fuel tank to enter the reservoir using a pressure difference generated during pumping of the fuel. The subsidiary jet pump includes a nozzle unit and a diffuser unit. The diffuser unit surrounds an injection portion of the nozzle unit with a suction channel disposed therebetween. The suction channel has a suction hole and a discharge hole and is structured to cause fuel suctioned through the suction hole and fuel discharged through the discharge hole to flow in the same direction.

14 Claims, 9 Drawing Sheets

(51) Int. Cl.
    *B60K 15/03*           (2006.01)
    *B60K 15/077*         (2006.01)
    *F04F 5/24*            (2006.01)
    *F04F 5/46*            (2006.01)
    *F17C 13/00*          (2006.01)
    *F02M 37/10*         (2006.01)
    *F02M 37/00*         (2006.01)

(52) U.S. Cl.
    CPC ............... *B60K 2015/03105* (2013.01); *B60K 2015/03111* (2013.01); *B60K 2015/03138* (2013.01); *B60K 2015/03144* (2013.01); *B60K 2015/0777* (2013.01); *Y10T 137/794* (2015.04); *Y10T 137/85978* (2015.04); *Y10T 137/86043* (2015.04); *Y10T 137/86075* (2015.04); *Y10T 137/86212* (2015.04)

(56) References Cited

FOREIGN PATENT DOCUMENTS

| | | |
|---|---|---|
| KR | 10-0793998 B1 | 1/2008 |
| KR | 10-2009-0126380 A | 12/2009 |
| KR | 10-2011-0107060 A | 9/2011 |
| KR | 10-2011-0113356 A | 10/2011 |
| KR | 10-2013-0002526 A | 1/2013 |

\* cited by examiner

FUEL FEEDING SYSTEM FOR VEHICLE

CROSS-REFERENCE TO RELATED APPLICATION

The present application claims priority of Korean Patent Application Number 10-2014-0075976 filed on Jun. 20, 2014, the entire contents of which application are incorporated herein for all purposes by this reference.

BACKGROUND OF INVENTION

1. Field of Invention

The present invention relates to a fuel feeding system for a vehicle and, more particularly, to a fuel feeding system for a vehicle, which is capable of improving suction volumetric efficiency by using a subsidiary jet pump having a modified structure.

2. Description of Related Art

In a Gasoline Direction Injection (GDI) engine, a fuel feeding system that transports fuel from a fuel tank to an engine includes a fuel pump module that transports fuel stored in a fuel tank up to a preceding stage of a high pressure pump, the high pressure pump that increases the pressure of fuel, a fuel pressure rail that maintains a high pressure of fuel before fuel is injected into cylinders, and an injector that injects fuel into the cylinders.

In the fuel feeding system, an upstream portion up to the preceding stage of the high pressure pump is called Low Pressure Circuit (LPC). FIG. 1 is a diagram illustrating a portion of an LPC of a fuel feeding system, which is disposed in a fuel tank.

With reference to FIG. 1, the inside of a fuel tank 1 is equipped with a reservoir 2 that stores fuel for a predetermined period of time to stabilize supply of fuel, a fuel pump 3 that pumps out fuel to an engine by pressurizing the fuel, and a fuel filter 4 that filters out foreign matter contained in fuel which is sent to the fuel pump 3.

In addition, a jet pump 5 and an anti-siphon valve 6 are installed in the fuel tank 1. The jet pump 5 turns pressure energy into kinetic energy by causing a portion of fuel pressurized by the fuel pump 3 to pass through a small nozzle and makes surrounding fuel enter the reservoir 2 using negative pressure generated at this time. The anti-siphon valve 6 prevents fuel in the reservoir 2 from flowing out through the jet pump 5 when an engine is turned off.

There is also a pressure regulator 7 for maintaining a constant pressure of the fuel transported to an engine.

Typically, a rear end of the nozzle of the jet pump 5 is provided with a mixing chamber and an expanding tube to effectively create a predetermined pressure (negative pressure). A conventional fuel tank includes only one jet pump to pump fuel out of the fuel tank 1 into the reservoir 2.

Meanwhile, as illustrated in FIG. 2, a saddle fuel tank 10 uses two jet pumps 17 and 19. One of the two jet pumps transports fuel in a main chamber 11 to a reservoir 15 and the other transports fuel in a subsidiary chamber 13 to the main chamber 11.

The dual jet pump system has a disadvantage of low suction volumetric efficiency attributable to a long distance between the jet pumps and a suction pipe disposed in the subsidiary chamber.

In addition, the dual jet pump system is disadvantageous in that suction recovery speed is very low when the suction pipe in the subsidiary chamber is exposed to air and then becomes submerged, i.e., under the condition of a low flow rate of fuel.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the prior art and/or other problems, and the present invention is to provide a fuel feeding system for a vehicle, which is capable of improving suction volumetric efficiency by using a subsidiary jet pump having a modified structure.

In various aspects, the present invention provides a fuel feeding system including: a fuel tank having an inside space which is divided into a first portion in which a reservoir is installed and a second portion; and a subsidiary jet pump installed in the second portion of the inside space of the fuel tank, in which the subsidiary jet pump pumps out fuel pressurized by a fuel pump and causes the fuel, stored in the second portion of the inside space of the fuel tank, to enter the reservoir using a pressure difference generated when the fuel is pumped out, in which the subsidiary jet pump includes: a nozzle unit having an inlet portion through which the fuel is introduced into the nozzle unit by the fuel pump and an injection portion which communicates with the inlet portion and through which the fuel is injected; and a diffuser unit which is structured to surround the injection portion, with a suction channel disposed between the injection portion and the diffuser unit and having a suction hole and a discharge hole at a first end and a second end of the suction channel, respectively, the diffuser unit being structured to cause fuel suctioned through the suction hole and fuel discharged through the discharge hole to flow substantially in a same direction.

The fuel tank may be a saddle fuel tank having an inside space divided into a main chamber and a subsidiary chamber, or a non-saddle fuel tank having an inside space made up of a single chamber.

The inlet portion may be disposed at one side of the injection portion. A direction in which the fuel is injected from the injection portion may be an upward direction and may be the same as both directions in which the fuel is suctioned and in which the fuel is discharged. A lower end of the diffuser unit may be spaced from a bottom surface of the fuel tank, and the fuel may be introduced into the second portion of the inside space of the fuel tank through the suction hole.

The nozzle unit may have a guide portion structured to surround an outer surface of the injection portion, and an outer surface of the guide portion may be attached to an inner surface of the diffuser unit using an attachment means. The attachment means includes a hooking protrusion formed on the outer surface of the guide portion and a hooking hole formed on the inner surface of the diffuser unit.

A fixed guide extending in a longitudinal direction of the guide portion may be formed on the outer surface of the guide portion, and a guide hole having a shape corresponding to a shape of the fixed guide may be formed at a lower end of the diffuser unit so that the fixed guide is able to be inserted into the guide hole.

Filtering protrusions may be arranged along a circumferential edge of a bottom surface of the guide portion, and the filtering protrusions may be supported on the bottom surface of the fuel tank. The filtering protrusions may be arranged in a radial pattern in reference to a center of a circumference of the guide portion.

A laminar flow forming portion may be formed between an inner surface of the guide portion and an outer surface of the injection portion. The laminar flow forming portion may be arranged in a radial pattern in reference to a center of a circumference of the guide portion.

An outer surface of the diffuser unit may be fixed to a bottom surface of the fuel tank via a fixing bracket. A second end of the inlet portion may be equipped with a sealing housing, an anti-siphon valve having a check valve assembly may be installed in the sealing housing, and the anti-siphon valve may be connected to the fuel pump, so that the fuel pressurized by the fuel pump can be introduced into the inlet portion through the anti-siphon valve.

The fuel feeding system for a vehicle may further include a main jet pump which is installed in the reservoir, pumps the fuel pressurized by the fuel pump, and causes the fuel in the first portion of the inside space of the fuel tank to enter the reservoir using a pressure difference generated when the fuel is pumped out, in which a branch pipe is connected to the fuel pump, the main jet pump, and the subsidiary jet pump, so that the fuel pressurized and sent by the fuel pump is divided into a flow to the main jet pump and a flow to the subsidiary jet pump via the branch pipe. The branch pipe may be a T-shaped pipe and may be connected to an upper end of the reservoir.

A first end of a suction tube may be connected to the discharge hole of the diffuser unit, a discharge pipe may be connected to an upper end of the reservoir in a manner such that an opening of the discharge pipe faces an inside of the reservoir, and a second end of the suction tube may be connected to the discharge pipe, so that fuel discharged through the discharge hole can be discharged into the inside of the reservoir.

The present invention has an advantage of improving suction volumetric efficiency by causing a flow of fuel suctioned through an inlet portion and a flow of fuel discharged through an outlet portion to head in the same direction (e.g., upward direction).

In addition, since a diffuser unit and a guide portion are combined in an inserted manner when the diffuser unit and the guide portion are assembled together, assembling work is easy and simple and binding force between the diffuser unit and the guide portion is increased. Furthermore, since there is a laminar flow forming portion, a laminar flow of fuel is formed when fuel is introduced through the inlet portion, improving suction volumetric efficiency, and rigidity and durability of a nozzle unit are improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
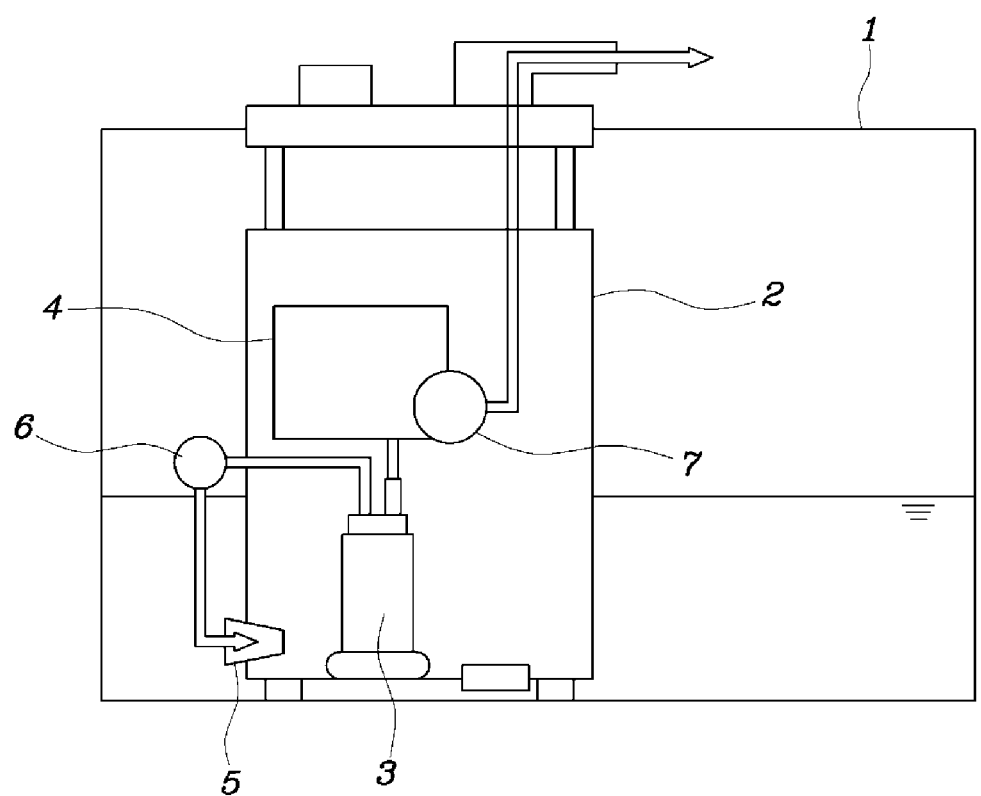
FIG. 1 is a diagram illustrating a fuel feeding system disposed in a fuel tank according to related art.
Figure 2:
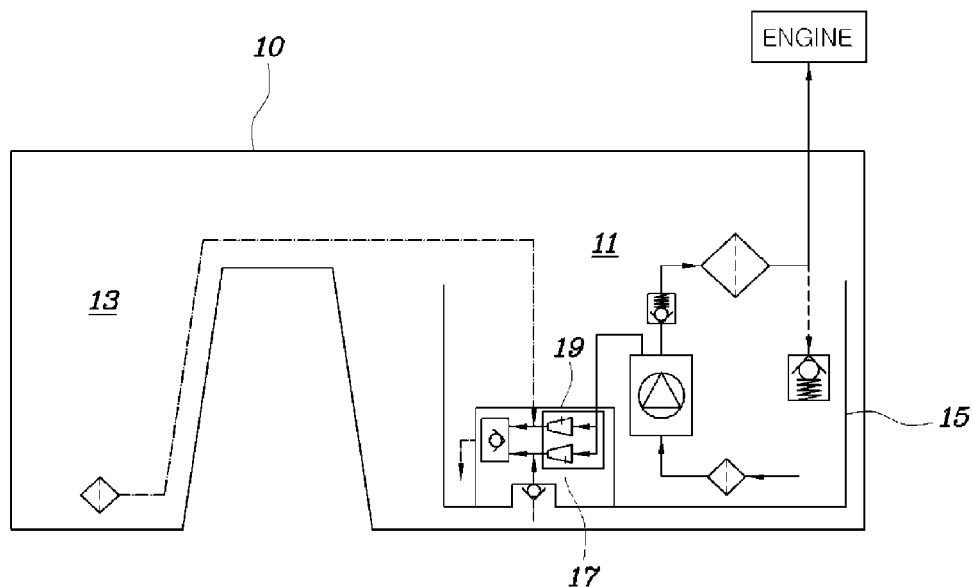
FIG. 2 is a diagram describing a fuel feeding path in a dual jet pump system according to related art.
Figure 3:
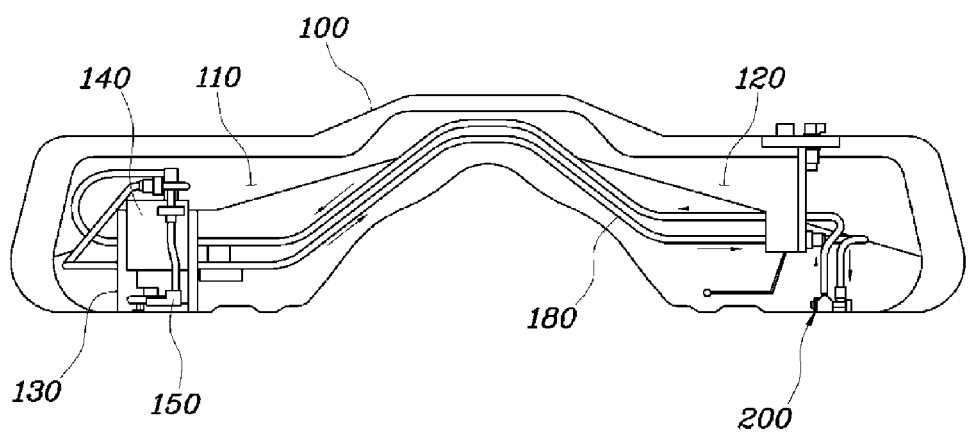
FIG. 3 is a diagram illustrating construction of a saddle fuel tank of an exemplary fuel feeding system according to the present invention.
Figure 4:
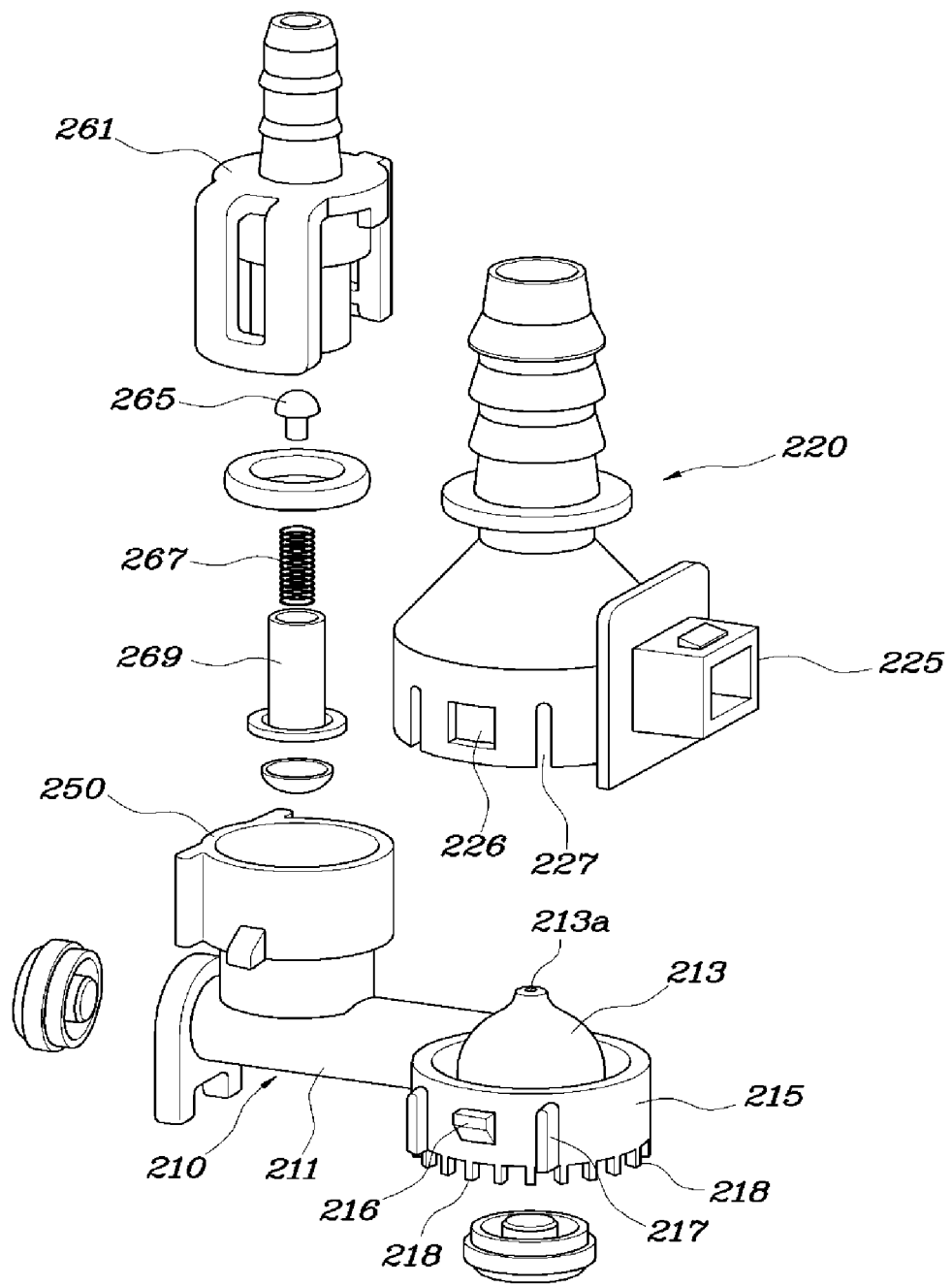
FIG. 4 is an exploded perspective view illustrating an exemplary subsidiary jet pump and an exemplary anti-siphon valve, which are disassembled from each other, according to the present invention.
Figure 5:
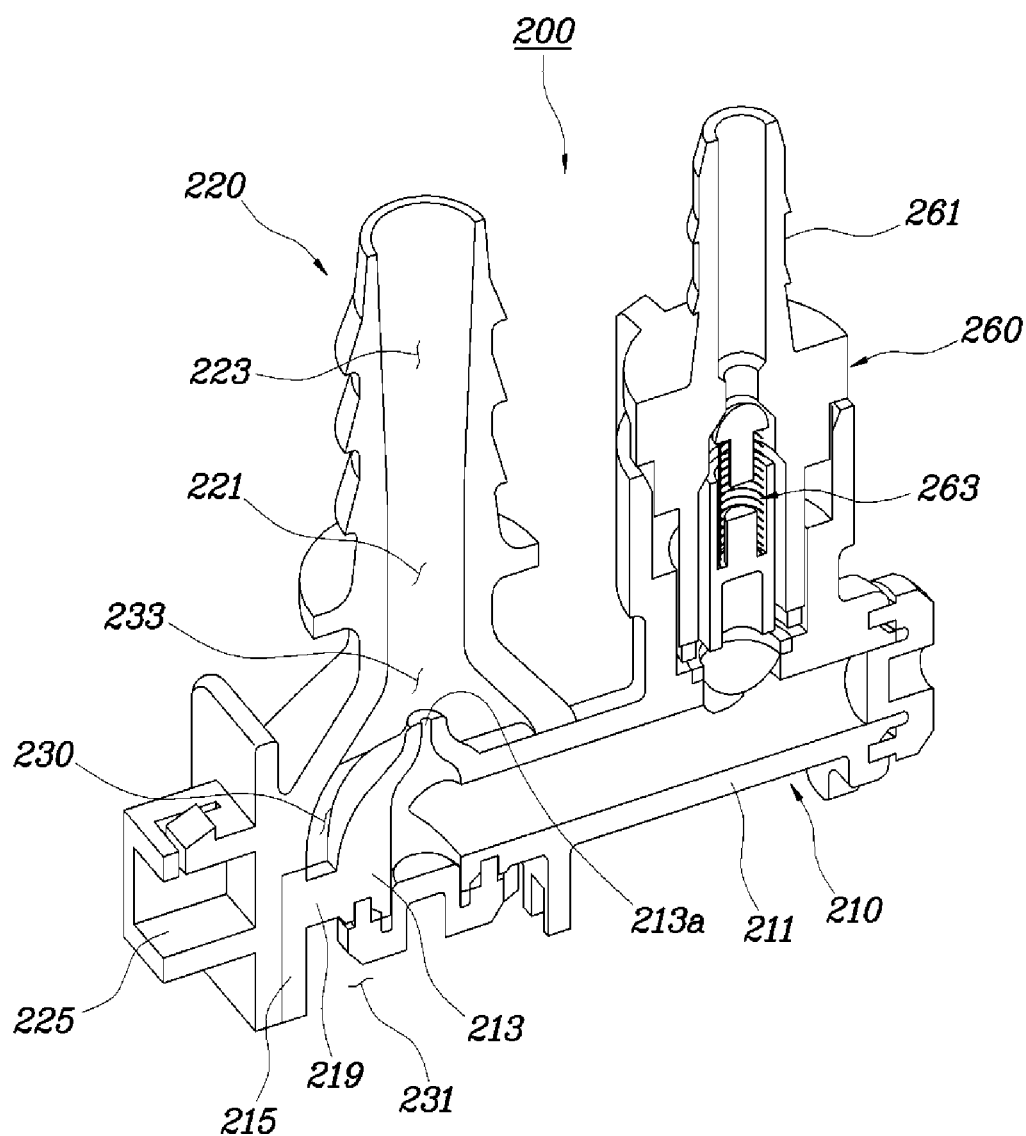
FIG. 5 is a perspective view illustrating an internal construction of an exemplary subsidiary jet pump and an exemplary anti-siphon valve according to the present invention.
Figure 6:
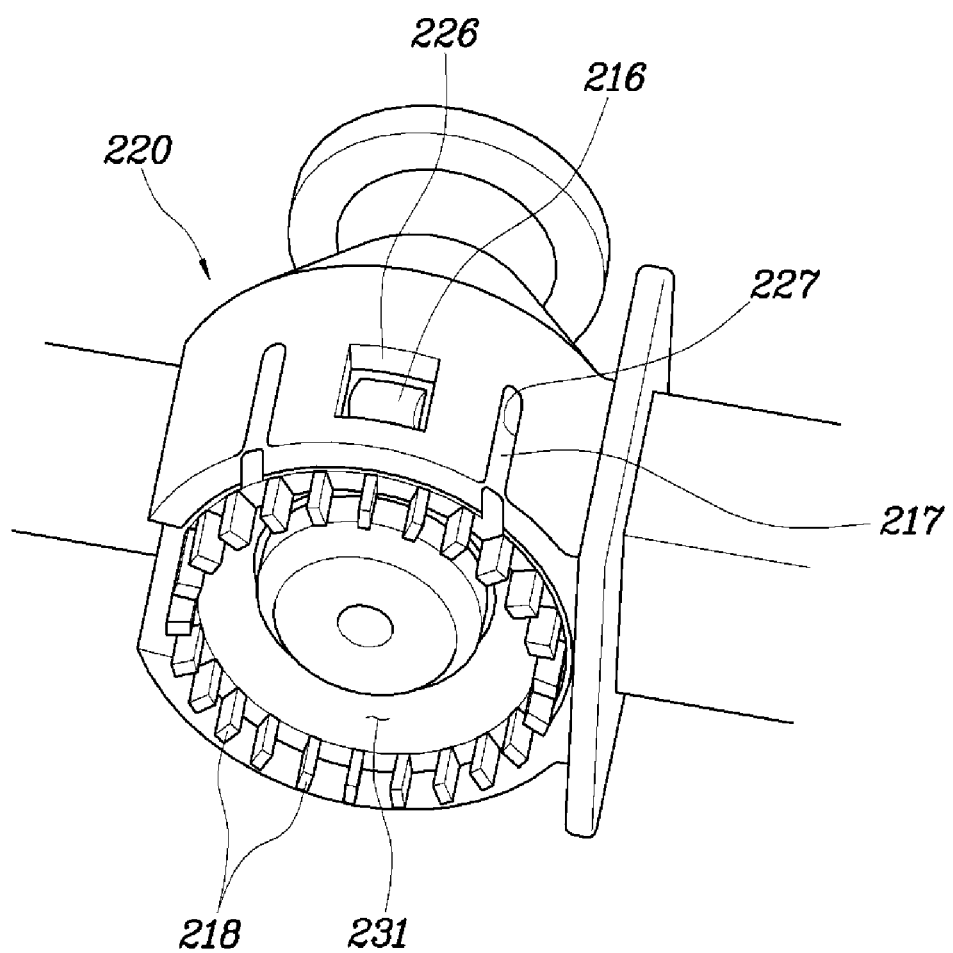
FIG. 6 is a perspective view illustrating filtering protrusions of an exemplary subsidiary jet pump according to the present invention.
Figure 7:
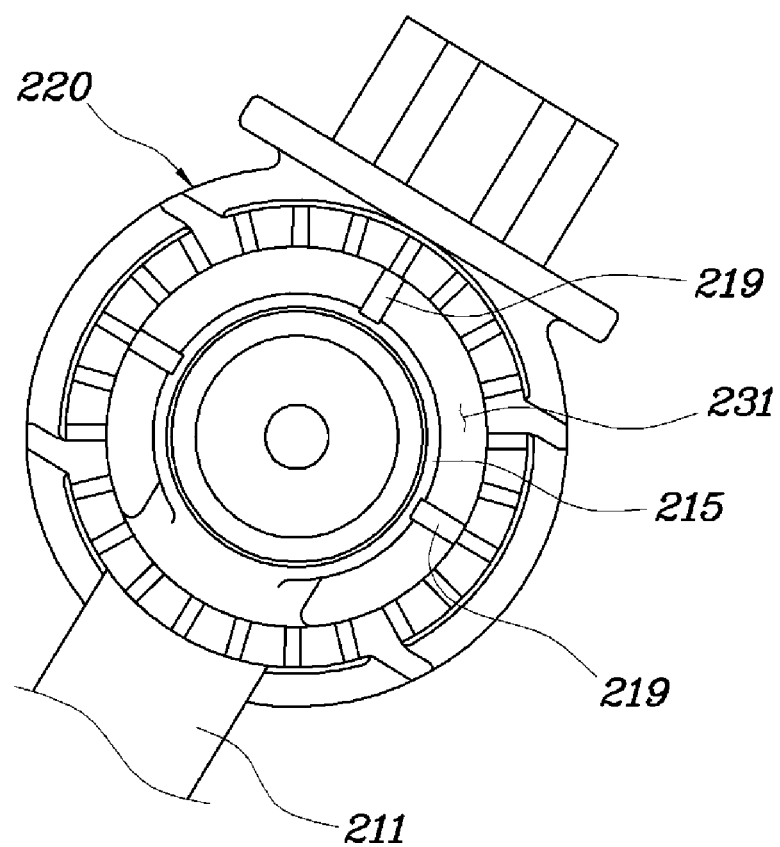
FIG. 7 is a diagram illustrating filtering protrusions of an exemplary subsidiary jet pump and an exemplary laminar flow forming portion according to the present invention.
Figure 8:
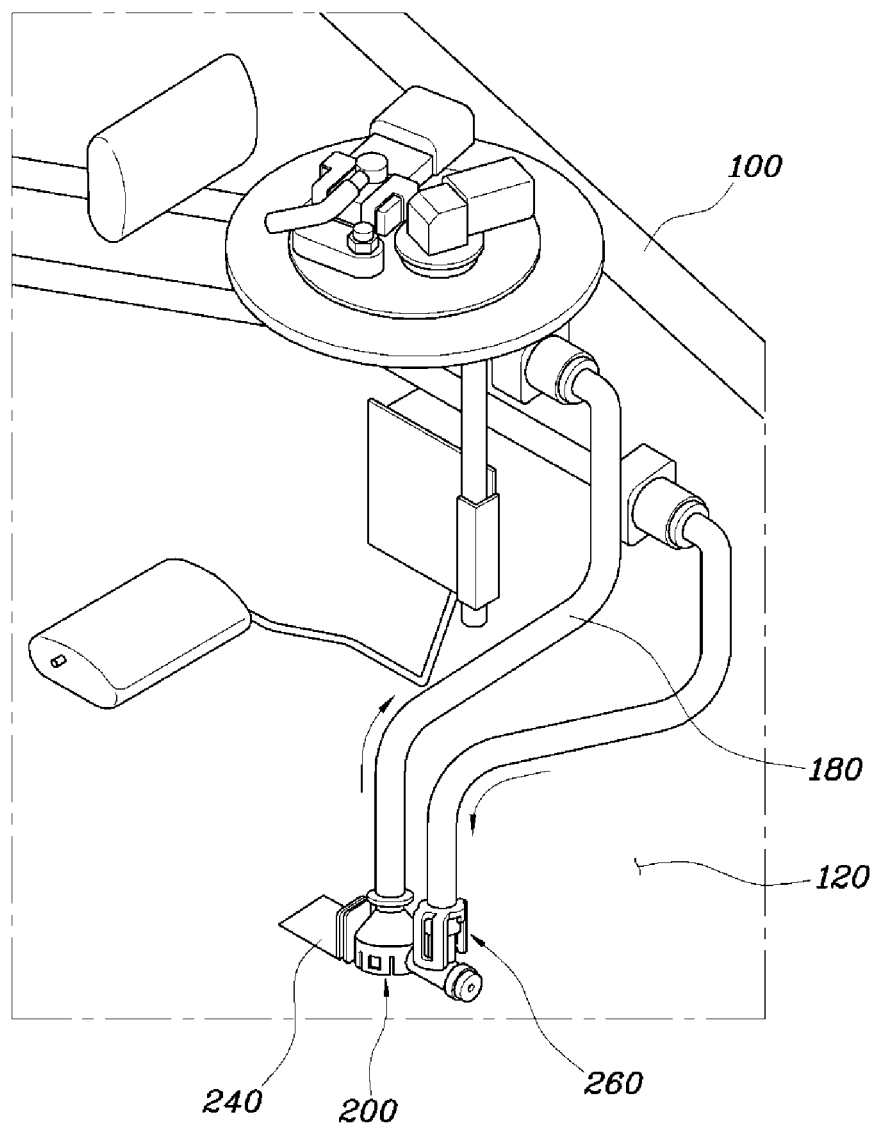
FIG. 8 is a perspective view illustrating arrangement of an exemplary subsidiary jet pump and an exemplary anti-siphon valve according to the present invention.
Figures 9A, 9B:
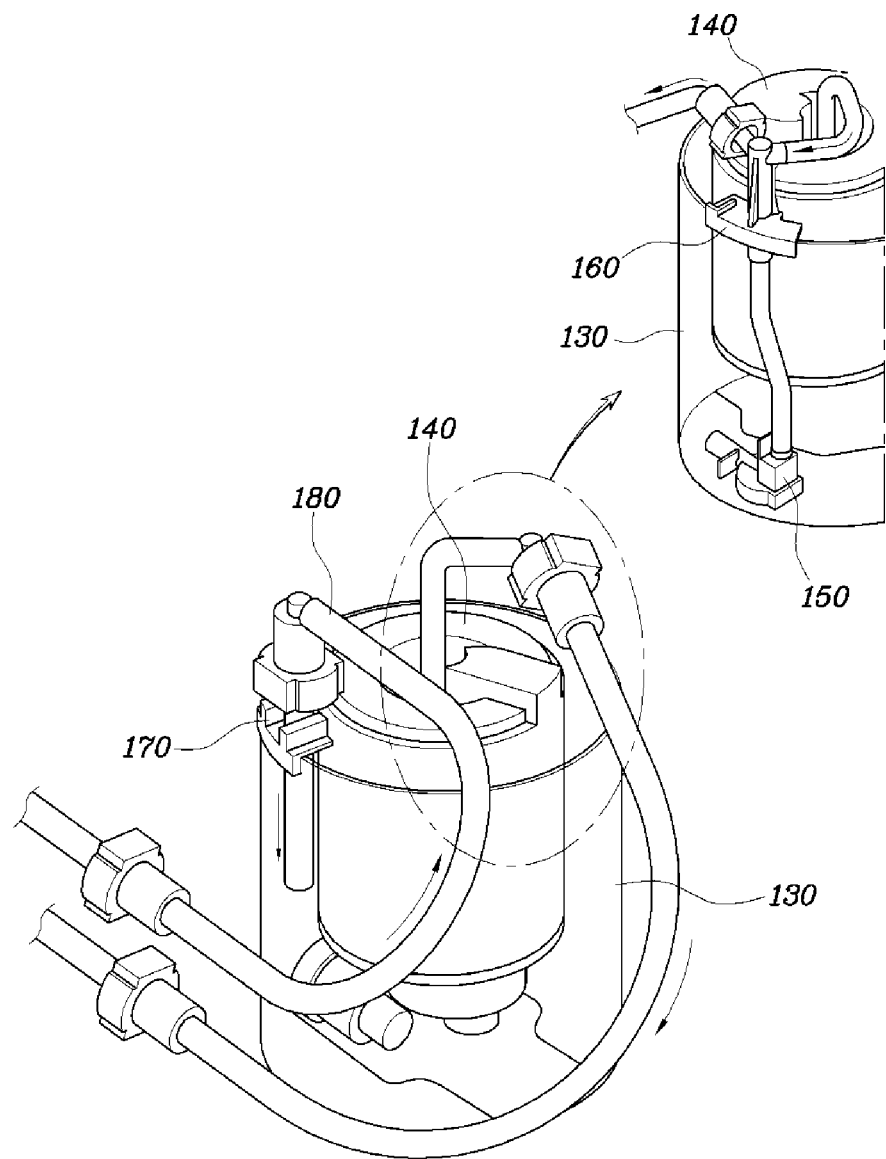
FIG. 9A is a diagram illustrating arrangement of an exemplary branch pipe and an exemplary discharge pipe and illustrating a flow of fuel according to the present invention.
FIG. 9B is a partially enlarged view of FIG. 9A.
Figure 10:
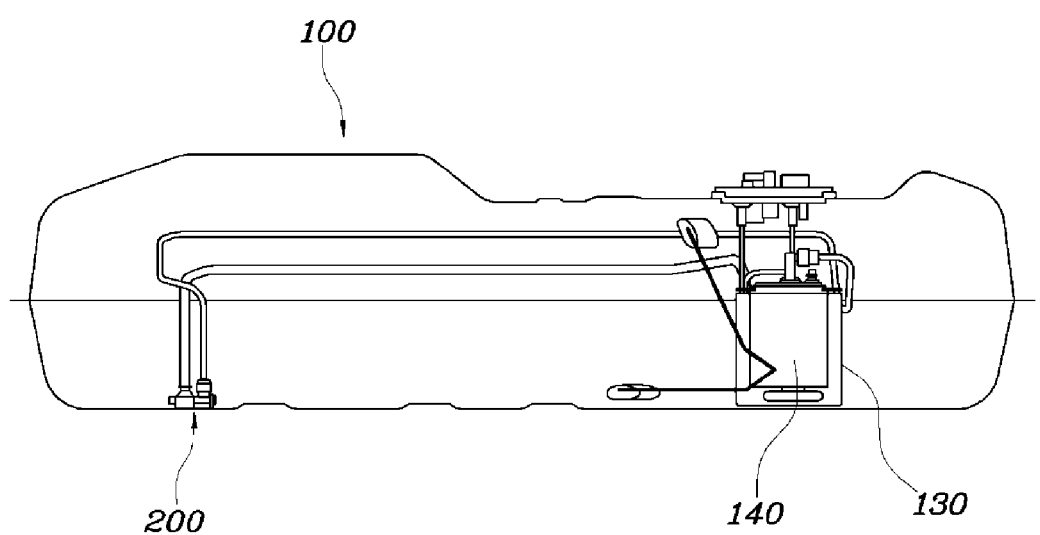
FIG. 10 is a diagram illustrating construction of an exemplary non-saddle fuel tank serving as a fuel feeding system according to the present invention.

FIG. 3 illustrates the overall construction of a fuel feeding system according to various embodiments of the present invention. FIG. 4 illustrates a subsidiary jet pump and an anti-siphon valve which are disassembled from each other. FIG. 5 illustrates the internal construction of the subsidiary jet pump and the anti-siphon valve. FIG. 6 illustrates filtering protrusions of the subsidiary jet pump according to various embodiments of the present invention. FIG. 7 illustrates the filtering protrusions of the subsidiary jet pump and a laminar flow forming portion according to various embodiments of the present invention. FIG. 8 illustrates arrangement of the subsidiary jet pump and the anti-siphon valve according to various embodiments of the present invention. FIGS. 9A and 9B illustrate arrangement of a branch pipe and a discharge pipe and illustrates a flow of fuel. FIG. 10 illustrates the overall construction of a non-saddle fuel tank serving as a fuel feeding system according to various other embodiments of the present invention.

A fuel feeding system according to various embodiments of the present invention roughly includes a fuel tank 100 and a subsidiary jet pump 200. The subsidiary jet pump 200 includes a nozzle unit 210 and a diffuser unit 220.

With reference to FIGS. 3 to 5, the fuel tank 100 has an inside space divided into a first portion in which a reservoir 130 is installed and a second portion in which the subsidiary jet pump 200 is installed. The subsidiary jet pump 200 discharges fuel pressurized by the fuel pump 140 and causes fuel in the second portion of the inside space of the fuel tank 100 to enter the reservoir 130 using a pressure difference generated when the pressurized fuel is discharged.

As illustrated in FIG. 3, the fuel tank 100 is a saddle fuel tank having compartments serving as a main chamber 110 and a subsidiary chamber 120, respectively. Alternatively, as illustrated in FIG. 10, the fuel tank 100 may be a non-saddle fuel tank with an inside space which is not divided into compartments. The present invention may be applied to both types of tanks, e.g., a saddle fuel tank and a non-saddle fuel tank. Hereinafter, for the sake of simplicity of description, only a saddle fuel tank will be described.

The subsidiary jet pump 200 includes the nozzle unit 210 and the diffuser unit 220. The nozzle unit 210 has an inlet portion 211 through which fuel flows into the nozzle unit from the fuel pump 140 and an injection portion 213 which communicates with the inlet 211 and from which fuel is injected. The diffuser unit 220 surrounds the injection portion 213. There is a suction channel 230 between the injection portion 213 and the diffuser unit 220. Respective ends of the suction channel 230 are provided with a suction hole 231 and a discharge hole 233, respectively. The diffuser unit 220 is structured such that fuel suctioned through the suction hole 231 and fuel discharged through the discharge hole 233 flow in the same direction.

An end portion of the injection portion 213 has an injection hole 213a shaped like an orifice. Fuel is injected through the injection hole 213a.

A second end portion of the diffuser unit 220 is connected to a mixing portion 221 followed by an expanding portion 223. The mixing portion 221 and the expanding portion 223 are continuously arranged in a lengthwise direction. These portions help with the effective generation of a negative pressure when fuel is injected through the injection portion 213.

The end of a second end portion of the inlet portion 211 and a lower end of the injection portion 213 may be provided with respective caps to prevent leakage of fuel contained in the nozzle unit 210.

The inlet portion 211 is disposed at one side of the injection portion 213 and extends in a lateral direction. The direction in which the fuel is injected from the injection portion 213 is the same as the directions of the flows which are suctioned and discharged. That is, the fuel is injected upward. A lower end of the diffuser unit 220 is spaced from the bottom surface of the fuel tank 100 so that the fuel stored in the second portion, i.e., the subsidiary chamber 120 in the inside space of the fuel tank, is introduced through the suction hole 231.

When the fuel, which is pressurized in the fuel tank 100, is introduced through the inlet portion 211, it flows through the inlet portion 211 and the injection portion 213 and then passes through the injection hole 213a, i.e., the fuel is injected upward from the diffuser unit 220. At this time, the fuel stored in the subsidiary chamber 120 is allowed to pass underneath the subsidiary jet pump through the suction hole 231 due to a negative pressure generated during the injection of fuel, and the introduced fuel flows toward the discharge hole 233 via the suction channel 213 and is then discharged upward from the diffuser unit 220 along with the fuel injected through the injection portion 213.

Since the suction hole 231 and the discharge hole 233 communicate with each other via the suction channel 230 and both of the suction hole 231 and the discharge hole 233 face the same direction (i.e., upward), suction volumetric efficiency is dramatically improved.

With reference to FIGS. 4 and 6, the nozzle unit 210 includes a guide portion 215 structured to surround the outer surface of the injection portion 213, and the outer surface of the guide portion 215 can be attached or coupled to the inner surface of the diffuser unit 220 using an attachment means.

Preferably, in some embodiments, the attachment means includes a hooking protrusion 216 and a hooking hole 226 formed on the outer surface of the guide portion 215 and the inner surface of the diffuser unit 220, respectively. The hooking protrusion 216 and the hooking hole 226 have corresponding shapes, respectively.

The guide portion 215 having a cylinder shape surrounds the injection portion 213 and it is spaced from the injection portion 213 so that the suction channel 230 is formed between the injection portion 213 and the guide portion 215.

The outer surface of the guide portion 215 and the inner surface of the diffuser unit 220 are attached or coupled to each other using the attachment means. To this end, the outer surface of the guide portion may be provided with the hooking protrusion 216, and the inside surface of a lower end portion of the diffuser unit 220 may be provided with the hooking hole 226 having a shape corresponding to the shape of the hooking protrusion 216 so that the hooking protrusion 216 can be inserted into and combined with the hooking hole 226.

The outer surface of the guide portion 215 is also provided with a fixed guide 217 extending in a longitudinal direction (e.g., vertical direction). The lower end of the diffuser unit 220 may be provided with a guide hole 22 having a shape corresponding to the shape of the fixed guide 217 so that the fixed guide 217 can be inserted into the guide hole 227.

When the diffuser unit 220 and the guide portion 215 are assembled together, the fixed guide 217 and the guide hole 227 automatically position the diffuser unit 220 and the guide portion 215. Accordingly, it is easy to assemble the diffuser unit 220 and the guide unit 215 together, and the binding force between the diffuser unit and the guide unit is strong because the fixed guide is inserted into the guide hole.

With reference to FIGS. 6 and 7, filtering protrusions 218 are formed on the bottom surface of the guide portion 215 and arranged along a circumferential edge of the bottom surface of the guide portion 215. The filtering protrusions 218 are supported on the bottom surface of the fuel tank 100. Preferably, in some embodiments, the filtering protrusions 218 may be arranged in a radial pattern in reference to the center of the circumference of the guide portion 215.

Since the filtering protrusions 218 are supported on the bottom surface of the fuel tank 100, the fuel in the subsidiary chamber 120 flows through the suction hole 231 passing through the filtering protrusions 218. Accordingly, foreign matter is filtered out by the filtering protrusions so that foreign matter will not enter the suction hole 231. Accordingly, it is unnecessary to install a prefilter which is necessarily used in conventional negative pressure-type jet pumps.

With reference to FIG. 7, a laminar flow forming portion 219 is disposed between the inner surface of the guide portion 215 and the outer surface of the injection portion 213. Preferably, in some embodiments, the laminar flow forming portion 219 may be formed in a radial shape in reference to the center of the circumference of the guide portion 215.

The laminar flow forming portion 219 increases suction volumetric efficiency by preventing formation of turbulence in the flow of fuel and by forming a laminar flow of fuel when fuel is introduced through the inlet portion and additionally reinforces rigidity and durability of the nozzle unit 210 by being disposed as a rib between the guide portion 215 and the injection portion 213.

With reference to FIGS. 5 and 8, the outer surface of the diffuser unit 220 may be fixed to the bottom surface of the fuel tank 100 using a fixing bracket 240. An attachment portion 225 having an attachment protrusion is disposed on a side surface of the diffuser unit 220. Accordingly, when the fixing bracket 240 is fixed to the bottom surface of the fuel tank 100, the fixing bracket 240 engages with the attachment protrusion, thereby fixing both of the diffuser unit 220 and the subsidiary jet pump 200 to the bottom surface of the fuel tank 100.

With reference to FIGS. 4 and 5, a sealing housing 250 is installed at a second end of the inlet portion 211, an anti-siphon valve 260 equipped with a check valve assembly 263 is installed in the sealing housing 250, and the anti-siphon valve 260 is connected to the fuel pump 140 so that the fuel pressurized by the fuel pump 140 can be introduced into the inlet portion 211 through the anti-siphon valve 260.

A valve housing 261 of the anti-siphon valve 260 is combined with the sealing housing 250 with an o-ring interposed therebetween. Since the sealing housing 250 protrudes upward, the anti-siphon valve 260 is also installed to protrude upward.

When the driving pressure of the fuel introduced through the anti-siphon valve 260 is equal to or higher than a predetermined pressure, a valve in the check valve assembly 263 opens allowing the fuel to flow to the injection portion 213. On the other hand, when an engine is stopped, the driving pressure of the fuel falls to below the predetermined pressure and the valve closes. At this time, the closed valve prevents the fuel in the main chamber 110 from flowing reversely to the subsidiary chamber 120.

The check valve assembly 263 may include a blocking member 265, a spring 267, and a valve seat 269. The inside of the valve housing 261 is equipped with the blocking member 265 to open or close the channel disposed in the anti-siphon valve 260. The spring 267 enables the blocking member 265 to be elastically displaced and returned to its original position. The valve seat 269 supports the spring 267.

With reference to FIGS. 3, 9, and 10, the main jet pump 150 is installed in the reservoir 130 to discharge the fuel pressurized by the fuel pump 140 and also discharges fuel stored in the fuel tank 100 to the reservoir 130 using a pressure difference generated when the pressurized fuel is discharged.

The main jet pump 150 may be the same as or similar to those used in the field of fuel feeding systems. Accordingly, description about fuel supply function and operation of the main jet pump 150 is omitted herein.

In addition, a branch pipe 160 is connected to the fuel pump 140, the main jet pump 150, and the subsidiary jet pump 200 so that the flow of the fuel pressurized and sent by the fuel pump 140 is divided into a flow through the main jet pump 150 and a flow through the subsidiary jet pump 200 via the branch pipe 160. Preferably, in some embodiments, the branch pipe 160 is a T-shaped pipe and is connected to an upper end of the reservoir 130.

The fuel pressurized by the fuel pump 140 is supplied to the main jet pump 150 and the subsidiary jet pump 200 via the branch pipe 160. Then, the fuel in the main chamber is introduced into the reservoir 130 by the main jet pump 150 and the fuel in the subsidiary chamber 120 is introduced into the reservoir 130 by the subsidiary jet pump 200 at the same time. For this reason, supply of the fuel to the reservoir 130 is facilitated.

A first end of the suction tube 180 is connected to the discharge hole 233 of the diffuser unit 220. The discharge pipe 170 is connected to the upper end of the reservoir 130 in such a manner that the flow of fuel from the discharge pipe 170 heads upward. A second end of the suction tube 180 is connected to the discharge pipe 170. By this connection, the fuel discharged from the discharge hole 233 is discharged into the reservoir 130.

That is, the fuel pumped by the subsidiary jet pump 200 2990 is introduced into the discharge pipe 170 via the suction tube 180, and this fuel discharged from the discharge tube 170 is discharged into the reservoir 130 because the discharge pipe 170 is connected to the upper end of the reservoir 130.

For convenience in explanation and accurate definition in the appended claims, the terms "upper" or "lower", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A fuel feeding system for a vehicle, comprising:
   a fuel tank having an inside space which is divided into a first portion in which a reservoir is installed and a second portion; and
   a subsidiary jet pump installed in the second portion of the inside space of the fuel tank, the subsidiary jet pump pumping out fuel pressurized by a fuel pump and causing the fuel, stored in the second portion of the inside space of the fuel tank, to enter the reservoir using a pressure difference generated when the fuel is pumped out,
   wherein the subsidiary jet pump includes:
      a nozzle unit having an inlet portion through which the fuel is introduced into the nozzle unit by the fuel pump and an injection portion which communicates with the inlet portion and through which the fuel is injected; and
      a diffuser unit which is structured to surround the injection portion, with a suction channel disposed between the injection portion and the diffuser unit and having a suction hole and a discharge hole at a first end and a second end of the suction channel, respectively, the diffuser unit being structured to cause fuel suctioned through the suction hole and fuel discharged through the discharge hole to flow substantially in a same direction,
   wherein the nozzle unit has a guide portion structured to surround an outer surface of the injection portion, and wherein an outer surface of the guide portion is attached to an inner surface of the diffuser unit using an attachment means.

2. The fuel feeding system as set forth in claim 1, wherein the fuel tank is a saddle fuel tank having an inside space divided into a main chamber and a subsidiary chamber, or a non-saddle fuel tank having an inside space made up of a single chamber.

3. The fuel feeding system as set forth in claim 1, wherein the inlet portion is disposed at one side of the injection portion, wherein the fuel injected from the injection portion flows in an upward direction and flows in the same direction as the fuel that is suctioned and the fuel that is discharged, and wherein a lower end of the diffuser unit is spaced from a bottom surface of the fuel tank, and the fuel is introduced into the second portion of the inside space of the fuel tank through the suction hole.

4. The fuel feeding system as set forth in claim 1, wherein the attachment means includes a hooking protrusion formed on the outer surface of the guide portion and a hooking hole formed on the inner surface of the diffuser unit.

5. The fuel feeding system as set forth in claim 4, wherein a fixed guide extending in a longitudinal direction of the guide portion is formed on the outer surface of the guide portion, and wherein a guide hole having a shape corresponding to a shape of the fixed guide is formed at a lower end of the diffuser unit so that the fixed guide is able to be inserted into the guide hole.

6. The fuel feeding system as set forth in claim 1, wherein filtering protrusions are arranged along a circumferential edge of a bottom surface of the guide portion, and wherein the filtering protrusions are supported on the bottom surface of the fuel tank.

7. The fuel feeding system as set forth in claim 6, wherein the filtering protrusions are arranged in a radial pattern in reference to a center of a circumference of the guide portion.

8. The fuel feeding system as set forth in claim 1, wherein a laminar flow forming portion is formed between an inner surface of the guide portion and the outer surface of the injection portion.

9. The fuel feeding system as set forth in claim 8, wherein the laminar flow forming portion is formed in a radial shape in reference to a center of a circumference of the guide portion.

10. The fuel feeding system as set forth in claim 1, wherein an outer surface of the diffuser unit is fixed to a bottom surface of the fuel tank via a fixing bracket.

11. The fuel feeding system as set forth in claim 1, wherein a second end of the inlet portion is equipped with a sealing housing, wherein an anti-siphon valve having a check valve assembly is installed in the sealing housing, and wherein the anti-siphon valve is connected to the fuel pump, so that the fuel pressurized by the fuel pump is introduced into the inlet portion through the anti-siphon valve.

12. The fuel feeding system as set forth in claim 1, further comprising:
a main jet pump which is installed in the reservoir and pumps the fuel pressurized by the fuel pump, causing the fuel in the first portion of the inside space of the fuel tank to enter the reservoir using the pressure difference generated when the fuel is pumped out,
wherein a branch pipe is connected to the fuel pump, the main jet pump and the subsidiary jet pump, so that the fuel pressurized and sent by the fuel pump is divided into a flow to the main jet pump and a flow to the subsidiary jet pump via the branch pipe.

13. The fuel feeding system as set forth in claim 12, wherein the branch pipe is a T-shaped pipe and is connected to an upper end of the reservoir.

14. The fuel feeding system as set forth in claim 1, wherein a first end of a suction tube is connected to the discharge hole of the diffuser unit, wherein a discharge pipe is connected to an upper end of the reservoir in a manner such that an opening of the discharge pipe faces an inside of the reservoir, and wherein a second end of the suction tube is connected to the discharge pipe, so that fuel discharged through the discharge hole is discharged into the inside of the reservoir.

\* \* \* \* \*